United States Patent [19]

Baldwin

[11] Patent Number: 4,837,695
[45] Date of Patent: Jun. 6, 1989

[54] METHOD AND APPARATUS FOR PREDICTING AND MONITORING AIRCRAFT TAKEOFF PERFORMANCE

[75] Inventor: Steven F. Baldwin, Lewisville, Tex.

[73] Assignee: E-Systems, Inc., Dallas, Tex.

[21] Appl. No.: 840,129

[22] Filed: Mar. 12, 1986

[51] Int. Cl.$^4$ .................. G01C 21/00; G06F 15/50
[52] U.S. Cl. .................... 364/427; 364/551.01; 73/178 T
[58] Field of Search ............. 364/424, 427, 550, 551, 364/900; 73/178 T

[56] References Cited

U.S. PATENT DOCUMENTS

| | | | |
|---|---|---|---|
| 3,038,329 | 8/1962 | Berggren | 73/588 |
| 3,111,577 | 11/1963 | De Graffenried et al. | 364/427 |
| 3,128,445 | 4/1964 | Hosford | 340/959 |
| 3,382,351 | 5/1968 | Schweighofer et al. | 364/427 |
| 3,779,455 | 12/1973 | Leibert | 235/95 R |
| 3,865,071 | 2/1975 | Manor | 73/178 T |
| 4,071,843 | 1/1978 | Marien | 342/55 |
| 4,110,605 | 8/1978 | Miller | 73/178 T |
| 4,251,868 | 2/1981 | Aron et al. | 364/427 |
| 4,368,517 | 1/1983 | Lovering | 364/428 |
| 4,373,184 | 2/1983 | Lambregts | 364/434 |
| 4,428,052 | 1/1984 | Robinson et al. | 364/436 |
| 4,454,582 | 6/1984 | Cleary et al. | 364/427 |
| 4,490,802 | 12/1984 | Miller | 364/567 |
| 4,563,685 | 1/1986 | Matsumoto et al. | 340/995 |
| 4,604,711 | 8/1986 | Benn et al. | 364/900 |
| 4,638,437 | 1/1987 | Cleary et al. | 364/427 |
| 4,642,775 | 2/1987 | Cline et al. | 364/420 |

OTHER PUBLICATIONS

Fusca, "Takeoff Monitor Computes Runway Roll", Oct. 1958, Aviation Wk., 99–105.
Small, Jr., Feasibility of Using Longitudinal Acceleration (Nx) for Monitoring Takeoff and Stopping Performance from the Cockpit, date unknown.
Captain David Gladwin, Takeoff Safety, publication date unknown.
E. H. Reitan and S. H. Saib, Interactive Computer Graphics in an All-Weather Landing System, Nov. 1976.

Primary Examiner—Parshotam S. Lall
Assistant Examiner—Thomas G. Black
Attorney, Agent, or Firm—Albert M. Crowder, Jr.

[57] ABSTRACT

A method for predicting and monitoring the takeoff performance of an aircraft uses information from one or more previous takeoffs of the aircraft to generate a prediction of the takeoff performance for the current takeoff. In the preferred embodiment, a takeoff profile for the current takeoff is generated and includes information about predetermined characteristics of the aircraft and information about ambient conditions at an airport from which the takeoff is being monitored. Expected performance data for the current takeoff is then generated from the takeoff profile and used to select a set of actual performance data previously stored from the one or more previous takeoffs. A selected "best-fit" actual performance data set is then displayed in an appropriate fashion. Upon takeoff, a set of monitored performance data is generated as a function of one or more of sensed takeoff parameters. The monitored performance data set for the current takeoff is then displayed in conjunction with the actual performance data previously selected to provide the crew with an indication of the progress of the current takeoff.

23 Claims, 3 Drawing Sheets

METHOD AND APPARATUS FOR PREDICTING AND MONITORING AIRCRAFT TAKEOFF PERFORMANCE

TECHNICAL FIELD

The present invention relates generally to an aircraft takeoff monitoring device and more particularly to an adaptive method and apparatus for predicting and monitoring the takeoff performance of an aircraft.

BACKGROUND OF THE INVENTION

Aircraft takeoff performance monitoring (TOPM) systems are well-known in the prior art Such systems monitor the progress of an aircraft during takeoff and provide information from which the aircraft crew can decide whether or not the expected takeoff performance is being achieved All heretofore known systems monitor one or more parameters (such as aircraft weight, aircraft speed and runway length remaining) during the takeoff roll, continuously compare instantaneous performance to a reference performance and then indicate to the crew by means of a display any variation from the reference performance. For example, U.S. Pat. No. 4,251,868 describes a takeoff detector system which provides the pilot with a visual display of the aircraft acceleration required to reach the maximum abort takeoff speed within a given length of runway. This system also informs the pilot of the aircraft ground speed and the length of the takeoff runway covered at all times during the takeoff Other representive TOPM systems are described in U.S. Pat. Nos. 3,048,329, 3,128,445, 3,779,455 and 3,865,071.

Prior art TOPM systems have proven generally effective for monitoring aircraft takeoff performance. Such systems, however, do not provide comprehensive takeoff prediction and monitoring capabilities for a particular aircraft. More specifically, prior art TOPM systems are incapable of generating predicted takeoff performance criteria based on previously monitored takeoff performances for the aircraft being monitored For any given takeoff, such systems can therefore produce small but significant inaccuracies in the takeoff prediction (i.e., the reference performance). These inaccuracies may cause the pilot to abort the takeoff even when the aircraft is not in danger or, in a worst case scenario, prevent the pilot from realizing that the takeoff presents a serious safety concern.

Accordingly, there is a need for a method and apparatus for "adaptive" aircraft takeoff performance monitoring which overcomes these and other problems of prior art TOPM systems.

BRIEF SUMMARY OF THE INVENTION

A method for predicting and monitoring the takeoff performance of an aircraft uses information from one or more previous takeoffs of the aircraft to generate a prediction of the takeoff performance for an upcoming (i.e., current) takeoff. According to the method, actual performance data from one or more previous takeoffs is stored in a takeoff history database The actual performance data will typically include speed, runway slope and runway friction (RCR) parameters. A weight profile is then generated for the current takeoff. The weight profile includes information about predetermined weight characteristics of the aircraft and information about the weight characteristics (e.g., weight of fuel and baggage) of a load to be transported by the aircraft.

The method then continues by generating a takeoff profile for the current takeoff. The takeoff profile includes information about one or more predetermined characteristics (e.g., aircraft "V" speeds and climb performance with "flaps up") of the aircraft and information about ambient conditions at an airport from which the takeoff will be monitored. Expected performance data for the current takeoff is then generated from the weight and takeoff profiles. The expected performance data will typically include one or more of the following parameters best acceleration curve, time and distance to the aircraft "V" speeds, maximum engine RPM, maximum allowable takeoff weight and optimum rotation angle According to the method of the present invention, the expected performance data is then used to select actual performance data previously stored which best represents the conditions for the current takeoff. This actual performance data is then displayed to the pilot on a full color graphics display.

Upon initiation of the current takeoff, monitored performance data is generated as a function of one or more sensed takeoff parameters (e.g. airspeed and weight of the aircraft on the nose wheel). The monitored performance data for the current takeoff is then displayed in conjunction with the actual performance data previously selected by the system to provide the aircraft pilot (or other crew-member) with an indication of the progress of the current takeoff. Following takeoff, actual performance data representing the takeoff is stored in the takeoff history database.

Accordingly, the method of the present invention therefore advantageously provides "adaptive" prediction and monitoring of aircraft takeoff performance based on cumulative information from one or more previous takeoffs of the aircraft.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figures 1, 3:
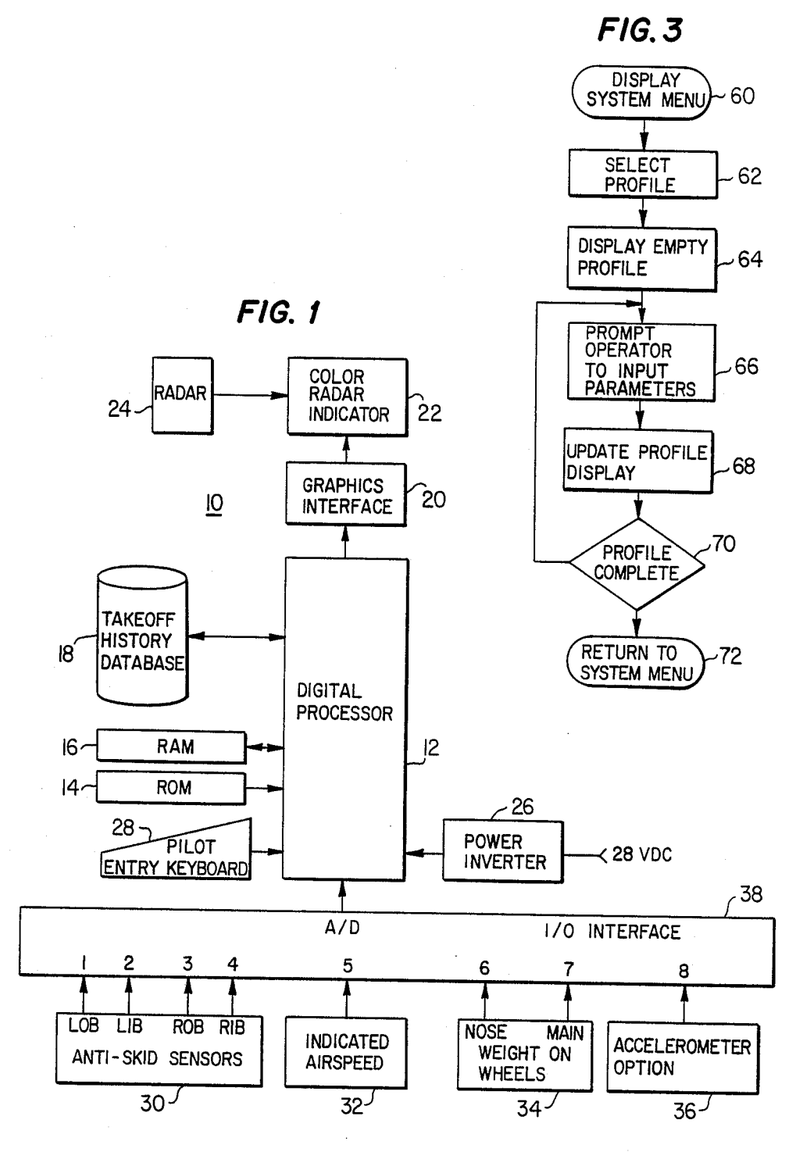
FIG. 1 is a block diagram of the preferred aircraft takeoff performance monitoring (TOMP) system of the present invention.
FIG. 3 is a flowchart detailing a profile generation subroutine for generating a weight or takeoff profile according to the method of FIG. 2.

With reference now to the FIGURES wherein like reference characters designate like or similar steps or parts throughout the several views, FIG. 1 is a block diagram of the aircraft takeoff performance monitoring (TOPM) system 10 of the present invention. The TOPM system 10 predicts and monitors the progress of an aircraft takeoff and provides information from which the aircraft pilot can decide whether or not the expected takeoff performance is being achieved The TOPM system includes a digital processor 12, a read only memory (ROM) 14 for storing operating system software and a random access memory (RAM) 16 for storing application software and data computations.

As also seen in FIG. 1, the TOPM system 10 includes a takeoff history database 18 for storing aircraft flight information (i.e., technical information about the aircraft's design and operating characteristics) and for storing cumulative "actual performance data" from one or more previous takeoffs Although not meant to be limiting, "actual performance data" may include measured acceleration, speed and distance parameters. In the preferred embodiment, "actual performance data" includes a plurality of indicated airspeed (IAS) samples for the takeoff run, information about the runway slope, and runway "friction" information represented by a runway condition range (RCR). System 10 also includes a graphic interface 20 which is controlled by the digital processor 12 and associated software for generating appropriate graphic displays on an indicator 22 (e.g., a color radar indicator) of the aircraft. When the TOPM system 10 is not using the indicator 22, this indicator receives radar signals for display from a radar subsystem 24. As will be described in more detail below, the indicator 22 is used to display full color graphics information to the pilot showing the predicted and monitored takeoff performance of the aircraft.

As also seen in FIG. 1, the TOPM system 10 includes an appropriate supply voltage connected through a power inverter 26 to the digital processor 12. A pilot entry keyboard 28 is used by the pilot (or other crewmember) to enter information about the aircraft and/or ambient conditions at the time and place of the takeoff. The pilot entry keyboard 28 interfaces to the digital processor 12 through a standard parallel input port. Preferably, the digital processor 12 (and associated software) controls the indicator 22 to display the key punched on the pilot entry keyboard 28 for user verification.

The takeoff performance monitoring system 10 also includes a plurality of sensors 30, 32, 34 and 36 for use in monitoring the actual aircraft performance during takeoff. In the preferred embodiment, sensor 30 provides speed information from a plurality of anti-skid transducers located respectively on the left outboard wheels (LOB), left inboard wheels (LIB), right outboard wheels (ROB) and right inboard wheels (RIB) of the aircraft. In particular, the individual transducers of the anti-skid sensor 30 convert the rotational speed of the respective wheels into an output voltage proportional to the speed of the aircraft.

Sensor 32 provides the indicated airspeed (IAS) of the aircraft during takeoff and is preferably provided from a flight computer (not shown). Sensor 34 provides "on-off" information about the weight of the aircraft on the main landing gear wheels and on the nose landing gear wheels. In particular, the signals from the sensor 34 are at a first logic level when the aircraft is on the ground and at a second logic level when the weight is off the respective gear wheels. Sensor 34 therefore provides an indication when the aircraft (or front portion thereof) has left the ground. Sensor 36 provides information from either an optional accelerometer input or an inertial navigation system (INS). Either option provides the digital processor 12 with additional information from which to compute the IAS during the initial portion of the takeoff run.

The analog outputs from sensors 30, 32, 34 and 36 are converted to digital form by an analog-to-digital (A/D) converter portion of an A/D-I/O interface circuit 38. The converted signals are then supplied to the digital processor 12 for processing under the control of the various programs stored in the processor's associated memory devices 14 and 16. It should be appreciated that use of the sensors 30, 32, 34 and 36 in conjunction with the method of the invention is not meant to be limiting and that all other types of sensors normally associated with aircraft control systems may also be used.

In the preferred embodiment of the invention, the takeoff Performance of the aircraft is predicted and monitored by the TOPM system 10 of FIG. 1 using cumulative information (i.e., actual performance data) from one or more previous takeoffs of the aircraft. One method of predicting and monitoring the takeoff performance of the aircraft according to the present invention operates in a manner described by the flowchart of FIG. 2.

Figure 2:
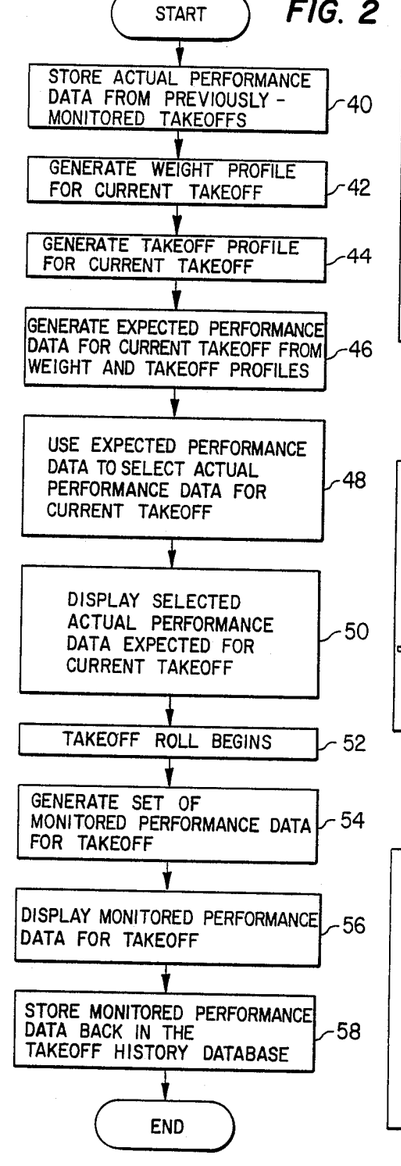
FIG. 2 is a flowchart of a preferred method for predicting and monitoring the takeoff performance of an aircraft according to the present invention.

Referring to FIGS. 1 and 2, the method begins at step 40 wherein actual performance data from previously-monitored takeoffs is stored in the takeoff history database 18. This actual performance data is preferably stored in sets, with each set corresponding to a previous takeoff. As will be described below, "actual performance data" includes acceleration, speed and distance data as well as information about runway slope and friction (RCR). At step 42, the operator generates a weight profile for a current takeoff. The weight profile preferably includes information about one or more predetermined weight characteristics of the aircraft and information about the weight characteristics (e.g., weight of passengers) of a load to be transported by the aircraft. Such information may be generated from sensors located at each seat of the aircraft. At step 44, the operator generates a takeoff profile for the current takeoff. The takeoff Profile preferably includes information about one or more predetermined characteristics (e.g., aircraft "V" speeds and climb performance with "flaps down") of the aircraft and information about ambient conditions (e.g., wind speed) at an airport from which the takeoff is being monitored.

The method continues at step 46 to generate expected performance data for the current takeoff from the weight and takeoff profiles generated in steps 42 and 44. Although not meant to be limiting, the expected performance data will usually include one or more of the following parameters: best acceleration curve, time and distance to the aircraft "V" speeds, maximum engine RPM, maximum allowable takeoff weight and optimum rotation angle. The "expected performance data" preferably includes (or is modified to incorporate) a built-in safety factor to insure that the conditions predicted for the current takeoff are within acceptable safety limits. At step 48, the expected performance data is then used to select a set of actual performance data which best represents the conditions for the current takeoff. At step 50, the selected actual performance data for the current takeoff is displayed in an appropriate fashion on the indicator 22 of the TOPM system 10. The method continues in step 52 as the current takeoff roll is initiated.

At step 54, the method generates a set of monitored performance data for the takeoff using information derived from the sensors 30, 32, 34 and 36, or any other system sensors. As the takeoff continues, the set of monitored performance data is displayed on the indicator 22 (or on a remote device at the airport) in conjunction with the selected actual performance data. This display provides the pilot of the aircraft with an indication of the progress of the current takeoff. In step 58, the monitored performance data is stored in the takeoff history database 18 after the takeoff for future use.

Accordingly, the preferred method for predicting and monitoring the takeoff performance of an aircraft uses an "adaptive" approach wherein a prediction of the takeoff performance for a current takeoff is based on cumulative information from one or more previous takeoffs of the aircraft. Stated differently, the TOPM system "learns" how to predict the takeoff performance of the specific aircraft based on the real takeoff experience of that aircraft. Moreover, because the system generates much more accurate predictive takeoff performance criteria than prior art TOPM systems, the pilot is provided with sophisticated and accurate information from which he or she can decide whether the takeoff must be aborted.

Referring now to FIG. 3, a simplified flowchart diagram is shown of the steps used to generate the weight or takeoff profile for the current takeoff. This "profile generation" subroutine corresponds to either step 42 or 44 of the method in FIG. 2. In step 60, a display system menu is generated for the TOPM system substantially as shown below in Table I:

TABLE I

TOPM MENU

Weight Profile
Takeoff Profile
Performance Monitor
Radar Display
Test Programs

Figure 4A:
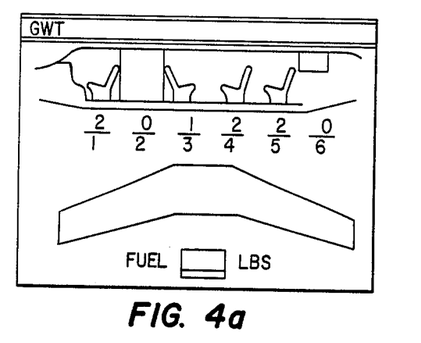
FIGS. 4a, 4b and 4c show various displays generated by the method for predicting and monitoring aircraft takeoff performance in FIG. 2.
Figure 4B:
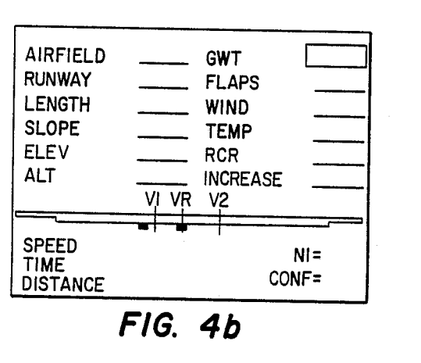

The TOPM Menu in Table I controls an executive program (to be described) which initializes the digital processor 12, controls switching between the other program modules to be described, and handles various other housekeeping functions. At step 62, the user selects a profile to be generated from the system menu. At step 64, an "empty" profile is displayed to the pilot on the color radar indicator 22. Referring briefly to FIGS. 4a and 4b, , preferred formats for the empty weight and takeoff profiles, respectively, are shown. As seen in these FIGURES, the weight profile provides a quick discernible overview of the fuel, baggage and passenger loads to be transported by the aircraft while the takeoff profile allows entry of information about the airport, runway direction, length, slope and elevation, altimeter setting, gross weight, flap setting, wind direction and velocity, air temperature, RCR value and percent increase in takeoff speed. The above variables are, of course, representative and not meant to be limiting.

Referring back to FIG. 3, at step 66, the operator is prompted by the system to enter input parameters for the profile. For example, if the weight profile is being generated, the operator would enter information about the weight (and location) of the passengers, pilot and baggage. Such information could also be entered automatically by suitable aircraft sensors. Likewise, if the takeoff profile is being generated, the operator would enter information about one or more of the parameters shown in FIG. 4b. The input parameters are then used to update the profile display at step 68 of the profile generation subroutine. At step 70, a test is made to determine whether the profile is complete. If not, the subroutine branches back to step 66 to prompt the operator to input additional parameters to complete the profile. If the profile is complete, the subroutine returns in step 72 to the system menu.

Accordingly, the "profile generation" subroutine in FIG. 3 is used by the pilot to generate weight and takeoff profiles for the current takeoff. To augment the profile generation process, the pilot may also rely on other technical information about the aircraft stored in the system. For example, as described above the generated "expected performance data" will preferably include a "maximum takeoff weight" parameter. Maximum takeoff weight for the aircraft is typically limited by the most restrictive of the following parameters: climb performance, maximum tire speed, field length, brake energy and maximum lading weight. The latter information (in the form of flight charts, for example) is stored in takeoff history database 18 of FIG. 1 and is recalled and displayed to the pilot to facilitate his or her completion of the takeoff profile. Of course, the predetermined characteristics of the aircraft used to produce the weight and takeoff profiles can include any number of other selected aircraft design and/or operating characteristics.

As discussed above with respect to FIG. 2, after the weight and takeoff profiles have been generated for the current takeoff, expected performance data for the current takeoff is then generated. The expected performance data includes the time and distance to the aircraft "V" speed parameters: maximum abort speed (V1), rotation to takeoff attitude speed (VR), and minimum takeoff safety speed (V2). In operation, the digital processor 12 of FIG. 1 first obtains the aircraft "V" speeds using digitized charts from the flight manual for the aircraft stored in the takeoff history database 18. The flight manual charts do not provide time and distance parameters for each "V" speed and these parameters must therefore be computed from the best acceleration curve. This curve is found in the takeoff history database 18 at step 48 of FIG. 2 when the generated expected performance data is used to select the (set of) actual performance data. Once the best acceleration curve (including a safety factor) is selected, the method calculates the "time" and "distance" to the "V" speeds based on the past performance of the aircraft.

Figure 4C:
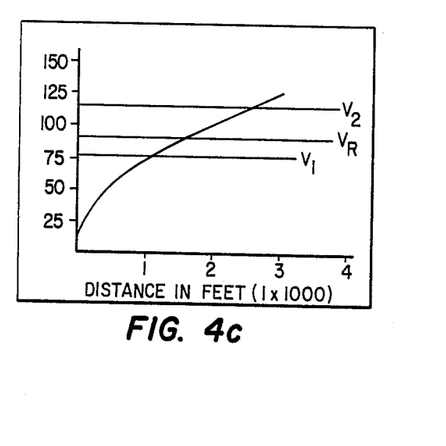

As previously described, the selected set of actual performance data for the current takeoff is then displayed to the pilot. For example, FIG. 4c shows an example of a best acceleration curve located by step 48 of FIG. 2. Likewise, when the digital processor 12 determines the time and distance criteria for the "V" speeds a graphics routine draws a runway representation (as seen in FIG. 4b) on the color radar indicator and identifies the points for V1, VR and V2 as well as the "time" and "distance" to these speeds. Should V2 extend beyond the length of the runway, the runway will preferably be shown in a first predetermined color (e.g., red). If less than a predetermined amount of runway remains at point V2, the runway will preferably be shown in a second predetermined color (e.g, yellow). In either situation, the display will indicate the amount of weight reduction needed for a safe takeoff. Preferably, the software controls the display to show only a representative portion (i.e., a "balanced field length") of the runway. FIG. 4c also reflects that the "V" speeds are preferably displayed on the IAS plot displayed to the pilot.

The size of the aircraft's takeoff history database 18 will determine the accuracy of the time and distance values for the "V" speeds. Accordingly, when the method finds the "best acceleration curve" or other parameter based on previous takeoff runs, it will also preferably display an indication of its confidence ("CONF") of such parameters. This indication is shown for example in FIG. 4b.

Figure 5:
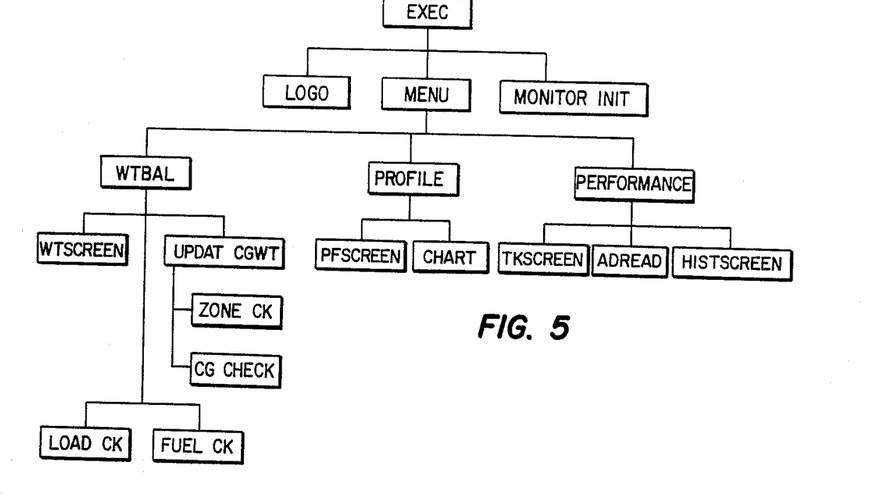
FIG. 5 is a block diagram of the various software modules used by the TOPM system of FIG. 1 for controlling the method of predicting and monitoring aircraft takeoff performance detailed in FIG. 2.

Referring now to FIG. 5, a block diagram is shown of the various software modules used by the method of the invention for predicting and monitoring takeoff performance of the aircraft. The software functions are divided into four primary modules, an executive module (EXEC), a weight and balance module (WTBAL), a takeoff profile module (PROFILE), and a takeoff performance monitor module (PERFORMANCE). The executive module (EXEC) is responsible for initializing the digital processor 12 and graphics display system. The EXEC module also places identification information on the display screen using a LOGO module, and calls a menu processing module ("MENU"). The MENU module displays the menu selections available to the operator as described above in Table I. The EXEC module also calls a module MONITORINIT to initialize the graphics interface 20 and the graphics library routines stored in the system memory.

When the user desires to generate the weight profile, the WTBAL module is selected. The display screen is formatted by a call to the module WTSCREEN. This module is responsible for drawing the empty weight profile (see FIG. 4a) and is aircraft dependent. In operation, a cursor is displayed in a first input field of the weight profile and input data read from the pilot entry keyboard 28 is displayed on the screen in that field. Each entry is used to update the weight profile on the display. For example, a module UPDAT CGWT is used to update the aircraft gross weight and center of gravity (CG) calculations in the weight profile.

Gross weight and center of gravity limit checks are performed using modules ZONE CK and CG CHECK. The ZONE CK module performs a zero fuel load center of gravity check using a center of gravity zone chart stored in the database 18. The resulting zone number is displayed. If the center of gravity falls outside of the chart range, an error condition is indicated by displaying a blinking value of zero. The CG CHECK module performs a takeoff load center of gravity check using the center of gravity load chart. If the center of gravity is outside the normal range, an error message is output indicating what percentage of the center of gravity is out of range of takeoff.

The module LOAD CK performes a maximum load limit check for each load station of the aircraft. The module FUEL CK performs a maximum fuel limit check for each fuel cell of the aircraft. For example, input data is a current fuel cell number and the fuel quantity entered. This value is compared to a maximum value for that fuel cell from an aircraft dependent table of fuel quantities stored in memory. If the maximum limit is exceeded, an error code is returned and an error indication is displayed on the screen. The LOAD CK module operates in a similar fashion.

Referring back to FIG. 5, the appropriate modules associated with the takeoff profile display are also shown. The PROFILE module is the main processing module and is responsible for all preflight performance chart processing. A call is made to the module PFSCREEN to display the empty takeoff profile (as shown in FIG. 4b) on the display screen. Input parameters are then input from the pilot entry keyboard 28. The module PFSCREEN also provides automatic storage of certain airport information to expedite generation of the profile. For example, when an airport identification code is entered, a search is made of a stored airport directory. If the airport code is found, the remaining runway data is automatically filled in on the takeoff profile display. If there if more than one runway at the airport, the operator may scan through the runways and select a runway he or she is using. Manual entries may be made if none of the stored entries are suitable or available.

A call is then made to a CHART module to perform the flight manual chart reading normally done by the flight crew. If the current loading exceeds maximum gross weight limits for the given condition, the CHART module displays an error message. This module also generates the graphical respresentation of the balanced field length of the runway at the bottom of the display screen showing time and distance to "V" speeds V1, VR and V2. As discussed above with respect to FIG. 2, information for this display is obtained from searching the takeoff history database 18 to determine the closest fit to the expected performance data of the current takeoff. Graphic displays are redrawn each time the operator changes a data value in the takeoff profile. If the predicted runway length requirements exceed the currently selected runway length, the CHART module augments the graphic display to indicate the error.

Referring back to FIG. 5, the third basic set of modules are controlled by the PERFORMANCE module. This module is responsible for monitoring the aircraft takeoff run in real-time and plotting a speed versus distance (acceleration) curve on the display. The module TKSCREEN is called to draw the performance plotting form on the screen. Module HISTSCREEN is then called to redraw the reference performance curve using the "closest fit" actual performance data from the history files selected by the PROFILE module processing. Upon initiation of the takeoff roll, monitored performance data is then input from the sensors 30, 32, 34 and 36. As noted above, these sensors preferably sense the main gear wheel speed, indicated air speed, weight on the main gear and weight on the nose gear. The sensed data is read and processed by module ADREAD.

Figure 6:
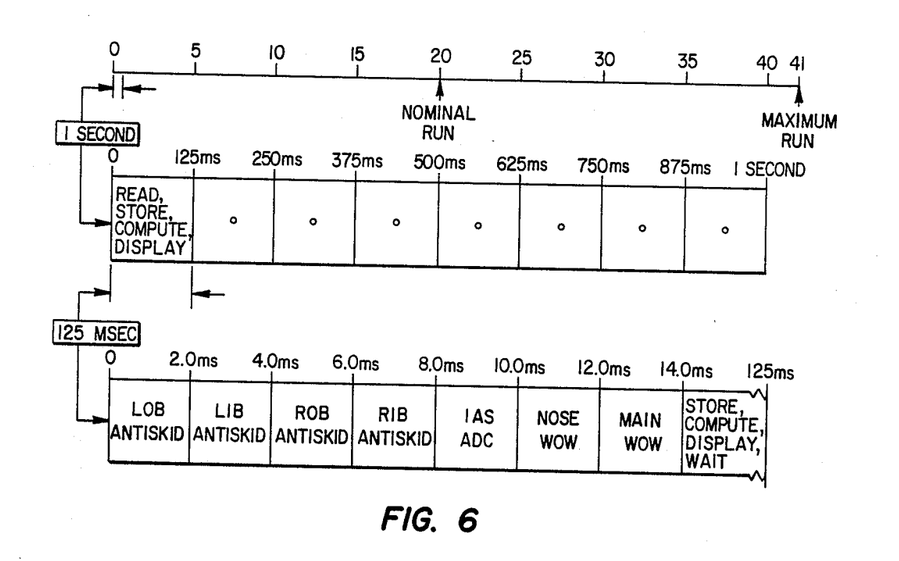
FIG. 6 is a graphical representation of a takeoff run of the aircraft detailing the time sequence in which the takeoff parameters are sensed to produce a generated set of monitored performance data for the takeoff in progress.

Referring now to FIG. 6, a graphical representation is shown of a representative takeoff run. As seen in FIG. 6, a one (1) second interval preferably contains eight (8) samplings of the aircraft sensors, with one sample completed in every 125 milliseconds. The sampling starts by reading and storing the d.c. voltage level of the left outboard (LOB) transducer and continues through the right inboard (RIB) transducer. Thereafter, the indicated airspeed (IAS) is read and stored, followed by the reading and storing of the weight on wheels (WOW) for both the nose gear (which determines time and distance to VR) and the main gear (which determines time an distance to V2). As described above with respect to FIG. 1, an additional channel is available to add an acceleration input if desired.

After liftoff is sensed by the main gear WOW, the digital processor 12 preferably saves the IAS information for each 125 millisecond interval throughout the takeoff run as well as the RCR and runway slope information. This information is the "monitored performance data" for the current takeoff. Moreover, although the TOPM system 10 does not automatically initiate action to abort a takeoff due to abnormal acceleration, it does provide suitable visual (and optional audible) warnings if a safe takeoff cannot be achieved.

In the preferred embodiment, the "actual performance data" is selected at step 48 in FIG. 2 by generating a 3-dimensional database storing variables (x,y,z), where "x" preferably equals takeoff weight, "y" preferably equals density altitude and "z" preferably equals runway slope. The expected performance data for the current takeoff locates a point f(x,y,z) in the database which acts as a "pointer" to select one of the sets of actual performance data stored from previous takeoffs.

Although the invention has been described and illustrated in detail, it is to be understood that the same is by way of illustration and example only and is not to be taken by way of limitation. The spirit and scope of this invention are to be limited only by the terms of the appended claims.

I claim:

1. A method for predicting and monitoring the takeoff performance of an aircraft, comprising the steps of:
   storing actual performance data monitored from previous takeoffs of the aircraft;
   generating a takeoff profile for a current takeoff of the aircraft, the takeoff profile generated from stored information about predetermined characteristics of the aircraft and information about ambient conditions at an airport for the current takeoff;
   generating predicted performance data for the current takeoff from the takeoff profile;
   selecting stored actual performance data for the current takeoff using the generated predicted performance data;
   displaying the selected stored actual performance data for the current takeoff;
   generating monitored performance data for the current takeoff; and
   displaying the monitored performance data for the current takeoff in conjunction with the selected stored actual performance data to provide an indication of the progress of the current takeoff.

2. A method for predicting and monitoring the takeoff performance of an aircraft as described in claim 1 further including the step of:
   storing the monitored performance data of the current takeoff with the stored actual performance data.

3. The method for predicting and monitoring the takeoff performance of an aircraft as described in claim 1 wherein the step of generating a takeoff profile includes the step of:
   generating a weight profile for the current takeoff of the aircraft, the weight profile including information about predetermined characteristics of the aircraft and information about the characteristics of the aircraft load.

4. The method for predicting and monitoring the takeoff performance of an aircraft as described in claim 3 further including the step of:
   using the weight and takeoff profiles to generate the predicted performance data for the current takeoff.

5. The method for predicting and monitoring the takeoff performance of an aircraft as described in claim 3 wherein the step of generating the takeoff profile includes the steps of:
   displaying a selection menu;
   selecting a profile option from the selection menu;
   displaying an empty aircraft profile;
   inputting by an operator the parameters for the empty aircraft profile;
   updating the empty aircraft profile as a function of the parameters input by the operator to produce the takeoff profile;
   determining whether all parameters input by the operator for the takeoff profile have been entered; and
   if all parameters for the takeoff profile have not been entered, repeating the step of inputting parameters.

6. The method for predicting and monitoring the takeoff performance of an aircraft as described in claim 1 wherein the step of displaying the stored actual performance data includes the steps of:
   displaying a selected acceleration curve, and
   displaying a representation of a runway showing an indication of time and distance to speeds V1, V2 and VR, where V1 is a maximum abort speed of the aircraft, V2 is a minimum takeoff safety speed for the aircraft and VR is a speed at which aircraft rotation to takeoff attitude occurs.

7. The method for predicting and monitoring the takeoff performance of an aircraft as described in claim 1 wherein the step of generating monitored performance data includes the steps of:
   receiving analog signals from aircraft sensors;
   converting the analog signals to digital form to generate a plurality of digital signals representing takeoff parameters; and
   processing the digital signals to determine the progress of the current takeoff.

8. The method for predicting and monitoring the takeoff performance of an aircraft as described in claim 7 wherein said sensors generate signals for one or more of the following parameters: main gear wheel speed, indicated airspeed, weight on main landing gear and weight on nose landing gear.

9. A method for predicting and monitoring the takeoff performance of an aircraft, comprising the steps of:
   storing one or more sets of actual performance data monitored from previous takeoffs of the aircraft, each of the sets of actual performance data corresponding to a previous takeoff;
   generating a weight profile for a current takeoff of the aircraft, the weight profile generated from stored information about predetermined characteristics of the aircraft and information about the characteristics of the current aircraft load;
   generating a takeoff profile for the current takeoff of the aircraft, the takeoff profile generated from stored information about predetermined characteristics of the aircraft and information about ambient conditions at an airport for the current takeoff;
   generating predicted performance data for the current takeoff from the takeoff profile and the weight profile;

selecting a set of stored actual performance data for the current takeoff using the generated predicted performance data;

displaying the selected set of stored actual performance data for the current takeoff;

generating monitored performance data for the current takeoff;

displaying the monitored performance data for the current takeoff in conjunction with the selected set of actual performance data to provide an indication of the progress of the current takeoff; and storing the monitored performance data for the current takeoff as a set of the stored actual performance data.

10. The method for predicting and monitoring the takeoff performance of an aircraft as described in claim 9 wherein the step of generating a takeoff profile includes the steps of:

displaying a selection menu;

selecting a profile option from the selection menu;

displaying an empty aircraft profile;

inputting by an operator the parameters for the empty aircraft profile;

updating the display of the empty aircraft profile as a function of the parameters input by the operator to produce the takeoff profile;

determining whether all parameters input by the operator for the takeoff profile have been entered; and if all parameters for the takeoff profile have not been entered, repeating the step of inputting parameters.

11. The method for predicting and monitoring the takeoff performance of an aircraft as described in claim 10 further including the steps of:

storing information relating to design and operating characteristics of the aircraft; and augmenting the generation of the weight profile or the takeoff profile from the stored information.

12. The method for predicting and monitoring the takeoff performance of an aircraft as described in claim 9 wherein the step of displaying the stored actual performance data includes the steps of:

displaying a selected acceleration curve; and displaying a representation of a runway showing an indication of time and distance to speeds, V1, V2 and VR, where V1 is a maximum abort speed of the aircraft, V2 is a minimum takeoff safety speed for the aircraft and VR is a speed at which aircraft rotation to attitude occurs.

13. The method for predicting and monitoring the takeoff performance of an aircraft as described in claim 12 wherein the step of displaying a representation of a runway further includes the steps of:

displaying the runway in a first predetermined color if the indication of distance at speed V2 extends beyond the length of the runway; and displaying the runway in a second predetermined color if the indication of distance at speed V2 extends less than a predetermined distance from the end of the runway.

14. Apparatus for predicting and monitoring the takeoff performance of an aircraft, comprising:

means for storing one or more sets of actual performance data monitoring from previous takeoffs of the aircraft, each of the sets of actual performance data corresponding to a previous takeoff;

means for generating a takeoff profile for a current takeoff of the aircraft, the takeoff profile generated from stored information about predetermined characteristics of the aircraft and information about ambient conditions at an airport for the current takeoff;

means for generating predicted performance data for the current takeoff from the takeoff profile;

means for selecting a set of stored actual performance data for the current takeoff using the generated predicted performance data;

means for displaying the selected set of stored actual performance data for the current takeoff;

means for generating monitored performance data during the current takeoff; and means for displaying the monitored performance data for the current takeoff in conjunction with the selected set of stored actual performance data to provide an indication of the progress of the current takeoff.

15. The apparatus for predicting and monitoring the takeoff performance of an aircraft as described in claim 14 wherein the means for storing actual performance data includes a takeoff history database of stored information relating to design and operating characteristics of the aircraft.

16. The apparatus for predicting and monitoring the takeoff performance of an aircraft as described in claim 14 wherein the means for displaying includes a color indicator.

17. The apparatus for predicting and monitoring the takeoff performance of an aircraft as described in claim 14 wherein the means for generating a set of monitored performance data comprises:

aircraft sensors; and an analog-to-digital converter for receiving analog signals from said sensors and in response thereto generating digital signals representing sensed takeoff parameters.

18. The apparatus for predicting and monitoring the takeoff performance of an aircraft as described in claim 17 wherein said aircraft sensors includes:

a plurality of anti-skid transducers operatively-connected to the main gear wheels of the aircraft to provide an indication of main gear wheel speed;

an indicated airspeed transducer; and first and second transducers for determining a weight on wheels of the main landing gear and the nose landing gear.

19. The apparatus for predicting and monitoring the takeoff performance of an aircraft as described in claim 17 wherein the takeoff parameters include main gear wheel speed, indicated airspeed, weight on nose landing gear and weight on main landing gear.

20. The method for predicting and monitoring the takeoff performance of an aircraft as described in claim 19 wherein the monitored performance data a includes main gear wheel speed, indicated air speed, weight on main landing gear and weight on nose landing gear.

21. A method for predicting and monitoring the takeoff performance of an aircraft using stored actual performance data monitored from previous takeoffs of the aircraft and stored information about predetermined characteristics of the aircraft, comprising the steps of:

generating information about ambient conditions at an airport for the current takeoff;

generating predicted performance data for the current takeoff from the stored information about predetermined characteristics of the aircraft and the generated information about ambient conditions at the airport for the current takeoff;
selecting stored actual performance data for the current takeoff using the generated predicted performance data;
generating monitored performance data for the current takeoff; and
displaying the monitored performance data for the current takeoff in conjunction with the selected stored actual performance data to provide an indication of the progress of the current takeoff.

22. The method for predicting and monitoring the takeoff performance of an aircraft as described in claim 21 wherein the step of displaying the stored actual performance data in conjunction with the monitored performance data for the current takeoff includes the step of:

displaying a representation of a runway showing an indication of time and distance for speeds V1, V2 and VR, where V1 is a maximum abort speed of the aircraft, V2 is a minimum takeoff safety speed for the aircraft, and VR is a speed at which aircraft rotation to takeoff attitude occurs.

23. The method for predicting and monitoring the takeoff performance of an aircraft as described in claim 21 including the step of storing the monitored performance data for the current takeoff with the stored actual performance data.

* * * * *